United States Patent [19]

Steinpichler et al.

[11] Patent Number: 4,843,631

[45] Date of Patent: Jun. 27, 1989

[54] PATTERN RECOGNITION PROCESS

[76] Inventors: Dietmar Steinpichler, Stadtplatz 23/10, A-3400 Klosterneuburg; Gerhard W. Österreicher, Kirchstetterngasse 44/22, A-1160 Wien, both of Austria

[21] Appl. No.: 98,621

[22] PCT Filed: Dec. 22, 1986

[86] PCT No.: PCT/AT86/00077

§ 371 Date: Aug. 13, 1987

§ 102(e) Date: Aug. 13, 1987

[87] PCT Pub. No.: WO87/03981

PCT Pub. Date: Jul. 2, 1987

[30] Foreign Application Priority Data

Dec. 20, 1985 [AT] Austria ............................... 3702/85

[51] Int. Cl.$^4$ .............................................. G06K 9/36
[52] U.S. Cl. ........................................ 382/43; 382/17; 382/48
[58] Field of Search ............... 364/576, 726, 827; 382/1, 10, 17, 31, 34, 39, 41–43, 48; 381/41–43

[56] References Cited

U.S. PATENT DOCUMENTS

| | | | |
|---|---|---|---|
| 4,227,176 | 10/1980 | Moshier | 382/17 |
| 4,282,579 | 8/1981 | Speiser et al. | 364/726 |
| 4,446,521 | 5/1984 | Inouye | 364/576 |
| 4,454,610 | 6/1984 | Sziklai | 382/43 |
| 4,660,151 | 4/1987 | Chipman et al. | 364/576 |
| 4,703,349 | 10/1987 | Bernstein | 364/726 |
| 4,718,094 | 1/1988 | Bahl et al. | 381/43 |

OTHER PUBLICATIONS

Altmann J. et al., "A Fast Correlation Method for Scale and Translation Invariant Pattern Recognition", *IEEE Trans or Pattern Ana. & Mach. Int.*, pp. 46–57, vol. PAMI-6, #1, Jan. 1984.

Tanaka et al., "Imprinted Character Recognition Using Template Matching on Spatial Complex Frequency Plane", *Pro. 3d Int. Joint Co. on Patt. Rec.*, pp. 663–666, Proc. 3, 1976.

Jacobson et al., "Invariant Analogical Image Representation and Pattern Recognition", *Pattern Recognition Letters*, Netherlands, pp. 289–299, No. 5, Sep. 1984.

*Primary Examiner*—Leo H. Boudreau
*Assistant Examiner*—Jose L. Couso
*Attorney, Agent, or Firm*—Lorusso & Loud

[57] ABSTRACT

A process for analyzing a two-dimensional image, wherein the structural identity of stored reference patterns with image contents or portions is determined, irrespective of the position of said image content or portion in the image to be analyzed. The image is subjected to a two-dimensional Fourier transformation operation and the separated amplitude distribution or power distribution is compared to amplitude or power distributions in respect of the reference patterns in the Fourier range, while determining the respective probability of identity, the twist angle and the enlargement factor as between the reference pattern and the image content or portion. Storage and processing of the image and the reference patterns or the Fourier transforms thereof are effected in digital form. In order to locate an image content or portion in the original image, which is identical with a reference pattern, the respective reference pattern or the Fourier transform thereof is assimilated to said image content or portion, in respect of size and orientation, by inverse rotary extension, with the ascertained twist angle and enlargement factor, and finally the position or positions at which the reference pattern when converted in that way has maximum identity with a section of the image is established.

20 Claims, 10 Drawing Sheets

PATTERN RECOGNITION PROCESS

BACKGROUND OF THE INVENTION

The invention relates to a process for analysing a two-dimensional image, wherein the structural identity of stored reference patterns with image contents or portions is determined, irrespective of the position of said image content or portion in the image to be analysed, by the image being subjected to a two-dimensional Fourier transformation operation and the separated-off amplitude distribution or a distribution which can be ascertained therefrom being compared to amplitude distributions or distributions which can be ascertained therefrom, in respect of the reference patterns, in the Fourier range, while determining the respective probability of identity, the twist angle and the magnification factor as between the reference pattern and the image content or portion.

Many areas of use call upon the function of being able to recognise or identify two-dimensional images, for example by means of a television camera, and being able clearly to establish the position thereof with respect to a zero point or an axis system. Mention may be made in this connection solely by way of example of the operation of precisely positioning a gripping arm of an industrial robot relative to a given article to be gripped. In accordance with the present invention, the term two-dimensional images means two-dimensional optical images or pictures but also two-dimensional patterns which are formed by values in two-dimensional association, but not necessarily of optical origin, for example two-dimensional signals in speech analysis.

The use of one-dimensional Fourier analysis for image analysis operations is known from medical diagnostics, in particular for outline classification of organs on X-ray pictures (outline line detection).

Besides the known methods which in the image space are based on outline recognition processes (that is to say corner and edge recognition), optical processes are also known in which two-dimensional Fourier transformation operations are carried out by means of lens assemblies. Such transformation operations provide that an image content or portion can be determined, irrespective of its position in the image to be analysed.

However the known optical processes suffer from major disadvantages which hitherto prevented use thereof in a practical situation for image analysis. Firstly, the optical system is extremely complex and costly while nonetheless being fairly inflexible in regard to the parameters when once set, such as for example the size of the image to be analysed. Identification of an image content or portion irrespective of the twist and size thereof in the image and determining the extent of the twist and increase in size (or reduction in size) relative to a reference pattern is in principle possible in real time, when using such optical arrangements. In practice there is also an interest in the location (or locations) at which the identified image portion occurs in the image. Establishing those locations is not possible by means of optical processes in real time as a photographic plate would be necessary in that respect, for intermediate storage purposes. In addition, at the present time there is still no possibility of rotating and reducing images by deliberate interference.

The object of the present invention is to provide a process of the general kind set forth in the opening part of this specification, with which the position of already identified image contents or portions in the image to be analysed can be determined in real time. The invention further seeks to provide that two-dimensional images (patterns) which are not of optical origin can also be analysed by means of the system.

SUMMARY OF THE INVENTION

In a process of the general kind set forth in the opening part of this specification, that is achieved in that storage and processing of the image and the reference patterns or the Fourier transforms thereof are effected in digital form and that to locate an image content or portion in the original image, which is identical with a reference pattern with the ascertained degree of probability of identity, the respective reference pattern or the Fourier transform thereof is assimilated to said image content or portion in respect of size and orientation by inverse rotary extension with the ascertained twist angle and magnification factor, and finally the position or positions at which the reference pattern when converted in that way has maximum identity with a section of the image is established.

By means of digital processing of the signals it is possible for the first time for the position of the detected image contents or portions in the image to be analysed to be ascertained in real time. The process according to the invention makes it possible to carry out any image analysis operations when suitable reference patterns are provided.

With the process according to the invention, any image content or portion which is contained entirely in the plane of the image can be identified irrespective of its position, twist, magnification, partial masking or obstruction, while at the same time providing an independent evaluation of the quality of identification (that is to say probability values in respect of object identification = probability of identity). Such quality evaluation is not adequately possible in the case of the processes which operate only in the image plane. In addition the process according to the invention gives the values in respect of twist and magnification relative to a reference pattern, and the position of the identified image content or portion in the image. A major difference in the process according to the invention, in comparison with the known processes which are based on corner and edge recognition, is the full functional effectiveness in relation to partially masked edges, corner or uneven surface illumination in respect of the images, articles or patterns to be recognised. Disturbances and interference in outline are therefore tolerated, more particularly to a parametrisable extent in that in the Fourier range structural details of the image are either emphasised or faded out by filtering.

It is possible by means of the process according to the invention to identify and locate a plurality of reference patterns in the image. That is also possible if a reference pattern frequently occurs in different states of twist and magnification. Even if a reference pattern (image content or portion) in the image occurs in the same state of magnification and orientation (twist), the system can identify same and specifically indicate where the individual reference patterns lie in the image.

In accordance with a further embodiment of the process according to the invention, it is particularly desirable if the amplitude distribution of the image, which occurs in the Fourier range, or a distribution which can be ascertained therefrom, are ascertained in the form of a real two-dimensional image matrix in polar coordinates, and then a two-dimensional polar rotary extension correlation in respect of said image matrix which is present in polar coordinates, with real reference matrices which are also prevent in polar coordinates (amplitude distribution or distribution in respect of the reference patterns, which can be ascertain therefrom), in respect of stored reference patterns, is produced as a result of which matrix values are obtained for probabilities of identity in respect of the correlated real image and reference matrices with associated twist angles and magnification factors of the image matrix in relation to the reference matrices.

It is also possible however to provide for conversion of the real amplitude matrix or a real image matrix which can be ascertained therefrom, in the Fourier range, into a polar coordinate system with logarithmic radius scale wherein the amplitude matrices of the reference objects or real reference matrices which can be formed are stored in a polar coordinate system with logarithmic radius scale whereby the rotary extension becomes a rotary displacement or shift, whereupon a polar rotary shift correlation operation is carried out. In that connection the term rotary displacement or shift denotes an operation in which the rotary extension is caused to degenerate or change insofar as the length of a radial section remains constant, irrespective of the increase in size in the original non-logarithmic polar coordinate system, but the section is displaced or shifted radially, in dependence on that increase in size. A particularly advantageous way of carrying out the first correlation operation provides that the coordinates of the logarithmic polar coordinate system are translated onto a right-angled axis system whereupon a discrete two-dimensional right-angled correlation in respect of the real image matrix with the reference matrices in the Fourier range is produced, with the rotary extension or rotary shift being resolved into two shifts along the axes of the axis system.

The reference patterns may already be contained in the reference storage means form the outset but it is more advantageous if, in a learning operation, the matrices which are present directly after the two-dimensional Fourier transformation operation in the Fourier range are stored, in the form of complex matrices or separate amplitude and phase matrices, by inputting or reading in known reference images, preferably by way of an input intermediate storage means, in the form of real or complex reference matrices, in reference storage means, in preferably abstractly hierarchical order.

In that connection, the term abstractly hierarchical order means the capacity on the part of the present process, after elimination of the parameters in respect of position, twist and magnification, independently to form generic terms from a plurality of similar image contents in a learning process and to store same or the Fourier transforms thereof as reference matrices. For example it is possible for what is known as a "standard face" which includes the features of a large number of faces to be stored at the top in a hierarchical structure. That gives the advantage that with the process according to the invention it is possible immediately to decide whether the image to be analysed is a face, whereupon further searching is performed only in low hierarchical order. There is also the advantage that even a face which is unknown to the system, although it cannot be identified thereby, can be at least recognised as such.

It is in principle possible that, in order to ascertain the position or positions of an image content or portion in the original image plane, which is recognised in the Fourier plane with a certain degree of probability of identity with a rotary-extension reference pattern, the reference pattern which has been subjected to inverse rotary extension with the ascertained values in respect of twist angle and magnification factor, in said image plane, is compared to the image to be analysed and the maximum or maxima in respect of identity is or are detected.

As the complex matrices of the actual image and the reference pattern already occur in the Fourier plane, in accordance with a further development of the process according to the invention it is particularly advantageous, in determining the coordinate values for the position of the actual image content or portion in the image, to make use of the correlation theorem (convolution theorem) thereby considerably reducing the number of computing steps. That is effected in that, in order to ascertain the position or positions of an image content or portion in the original image plane, which is recognised in the Fourier plane with a certain degree of probability of identity with a rotary-extension reference pattern, the complex reference matrix which is subjected to inverse rotary extension with the ascertained values in respect of twist angle and magnification factor is multiplied in a conjugated complex and element-wise manner by the complex image matrix in the Fourier range whereupon the complex product matrix is subjected to a two-dimensional Fourier back-transformation operation, and finally the maximum (or maxima) of the identity probability matrix obtained as a result of that correlation operation is or are detected and the coordinate value associated with said maximum (or maxima) are ascertained for the position or positions of the recognised image content or portion in the original image.

It is even more advantageous, also when using the convolution theorem, if, when employing semi-logarithmic polar coordinates the inverse rotary extension of the complex reference matrix is performed by inverse integral dispacement with respect to the logarithmic polar coordinates, whereupon the resulting matrix is subjected to coordinate conversion, by constantly associated reverse interpolation, to Cartesian coordination. In that alternative embodiment, care is taken in particular to avoid non-constantly associated interpolation effects. More specifically, for rotary extension of a matrix (in the present case, inverse rotary extension), by way of a Cartesian grid, it is necessary to have an interpolation effect which is dependent on the extent of the respective rotary extension as the elements obtained after the rotary extension step do not generally lie over grid points on the Cartesian grid.

By virtue of the above-mentioned embodiment, rotary extension can be performed, in logarithmic polar coordinates, in the form of a shift or displacement, more particularly without substantial limitation to integral grid spacings in the logarithmic polar coordinates (that is to say without interpolation). Reverse interpolation of the matrix which is subjected to extension in that way, to Cartesian coordinates is admittedly still necessary but, as the Cartesian and polar grids are constantly fixed relative to each other, it can be taken from a schedule, which considerably reduces the computing expenditure.

The only ambiguity which is still to be found, in twist of the article through 180° (the amplitude distribution or a distribution which can be ascertained therefrom has a periodicity of 180° in the Fourier plane) can be eliminated by a further inverse rotary extension operation being performed, with the ascertained value changed through 180° for the twist angle and the ascertained value in respect of the magnification factor, whereupon after the correlation operation has been carried out, any maxima in respect of probability of identity that may be present are detected.

In order reliably to avoid incorrect correlation results in the event of missing surface structuring of the images, in a further embodiment of the invention it can be provided that both the real reference matrix which is subjected to inverse rotary extension with the ascertained value in respect of the twist angle or that value which has been changed through 180° and also the real image matrix of the actual image, which is present after the two-dimensional Fourier transformation operation, are passed by way of respective contour-accentuating 0-phase filters before they are subjected to the conjugated complex multiplication operation, together with the associated phase matrices. Such a contour-accentuating 0-phase filter accentuates for example the elements of the amplitude matrix linearly with frequency, whereby higher frequencies (which in fact originate from edges and corners) are valued more highly.

The invention will now be described in greater detail by means of an embodiment with reference to the accompanying drawings in which:

BRIEF DESCRIPTION OF THE DRAWING

As shown in FIG. 1, the process according to the invention may be carried into effect by the successive interconnection of signal and matrix-processing stages. In general terms, in FIG. 1 the signal-processing stages have the top right corner cut off while all other stages represent storage means (that is to say matrix storage means) or intermediate storage means.

Figure 1:
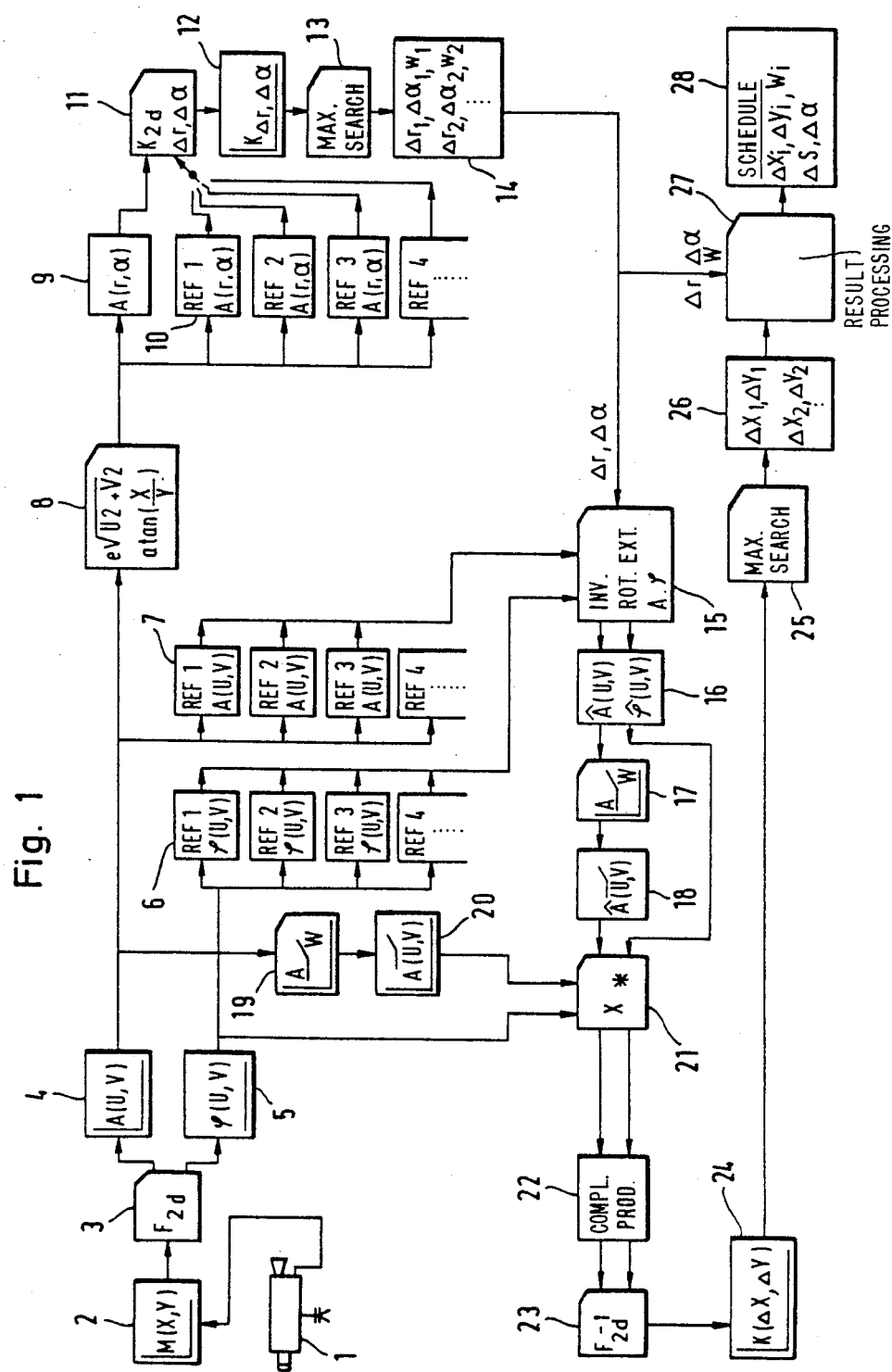
FIG. 1 shows a block circuit diagram of an embodiment of a system for carrying out the process according to the invention.

Firstly the television image signal from a television camera 1 or another two-dimensional pattern formed by values in two-dimensional association is stored in an input intermediate storage means 2 and then subjected in stage 3 to a two-dimensional Fourier transformation operation. Instead of the camera 1 it is also possible to use a synthetic image or pattern generator or for example a matrix of crossed wires with certain electrical or magnetic potentials at the points of intersection.

In the case of a television image or picture the amplitude corresponds to brightness in the respective points of the television picture or image. An axis system: x/y is associated with the image in that image plane. The amplitude values can then be written in the form of a matrix A (M,N) wherein M/N corresponds to the number of grid points in the respective x/y-directions. It is also possible to use the form of expression M (x,y) selected in FIG. 1, for the matrix in the x,y plane: for the specific article detection process the position of the sensitivity window of a camera which possibly represents an image on the spectral frequency axis is immaterial (infra-red image, night-vision image, ...).

However besides television images it is also possible to use all other two-dimensional amplitude value images or patterns which have image contents or portions, for example a given article or object such as a triangle or a letter. As an example in that respect, mention may also be made of a time-frequency band representation (vocoder) of a speech signal where amplitude values are plotted in an orthogonal frequency-time axis system.

In the case of a television image, it is necessary for it to be filed in an intermediate storage means 2 (individual image freezing).

The representation of the two-dimensional Fourier transformation operation reads as follows, in the continuous case:

$$F(U,V) = \iint_{-\infty}^{-\infty} A(X,Y)e^{-2\pi j(UX+VY)}dXdY$$

$$A(X,Y) = \iint_{-\infty}^{-\infty} F(U,V)e^{2\pi j(UX+VY)}dUdV$$

while in the discrete case it is as follows:

$$F(u,v) = \frac{1}{MN} \sum_X \sum_Y A(x,y)e^{-2\pi j(\frac{ux}{M} + \frac{vy}{N})}$$

$$A(x,y) = \sum_U \sum_V F(u,v)e^{2\pi j(\frac{ux}{M} + \frac{vy}{N})}$$

$X = x \cdot \Delta x$
$Y = y \cdot \Delta y$
$U = u \cdot \Delta u$
$V = v \cdot \Delta v$ F (u,v) represents the complex spectrum and comprises the two real matrices A (u,v) ..., real amplitude spectrum and $\phi$ (u,v) ... real phase spectrum. Besides that breakdown into amplitude spectrum and phase spectrum, if necessary it is also possible to provide for breakdown of the complex spectrum into real and imaginary sub-matrices.

The result of that two-dimensional Fourier transformation operation is stored in the intermediate storage means 4 for the amplitude matrix of the actual image or article or pattern and 5 for the phase matrix of said image or article or pattern.

The following consideration can be applied to fix the section in the Fourier plane (u/v-plane):

The greatest spatial frequency occurring corresponds to a 0/1-succession of grid amplitude to adjacent grid amplitude:

$$w_{max.} = \frac{N}{2} \text{ and } \frac{M}{2}, \text{ for } N + M \text{ (square image)}:$$

$$\sqrt{u^2 + v^2} \leq w_{max.}$$

The lowest frequency obtained is of a wavelength of $$\lambda_{max} = \frac{N\Delta x}{w_{min}} = N\Delta x = \text{image width } (N = M),$$

wherein $w_{min}=1$, that is to say one oscillation per N and M respectively.

On the basis of the condition $F(-u,-v)=F^*(u,v)$ the matrix height of both matrices can be halved without loss of information (except the zero line).

The characteristics of that discrete two-dimensional Fourier transformation operation are:

The amplitude matrix is image content-position invariant, that is to say one and the same picture content can be displaced as desired (in the x/y-plane) without the amplitude spectrum or the amplitude matrix changing (in the u/v-plane) (see FIGS. 2A-2D).

An increase in size in the image plane (x/y-plane) corresponds to a proportional reduction in size of the amplitude pattern or amplitude matrix in the Fourier plane (u/v-plane; see FIGS. 2A-2D and FIGS. 3A-3D). (It will be appreciated that the phase matrix is also proportionally reduced in size).

A twist or rotation in the image plane (x/y-plane) corresponds to a twist or rotation to the same extent and in the same direction in the Fourier plane (u/v-plane; see FIGS. 3A-3D and FIGS. 4A-4D).

Figure 2A:
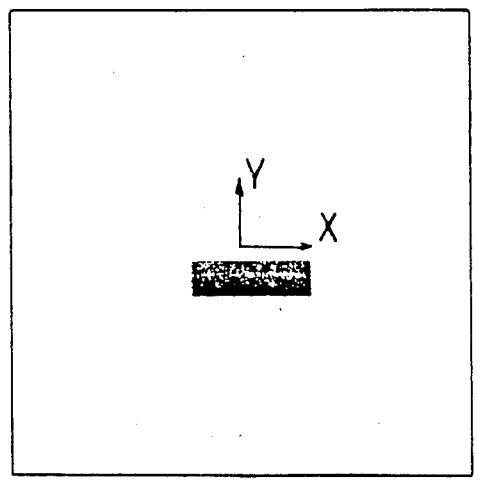
FIGS. 2A through 6H show picture screen representations of the image distributions in the image plane and in the Fourier range, which occur in various stages of the process according to the invention.
Figure 2B:
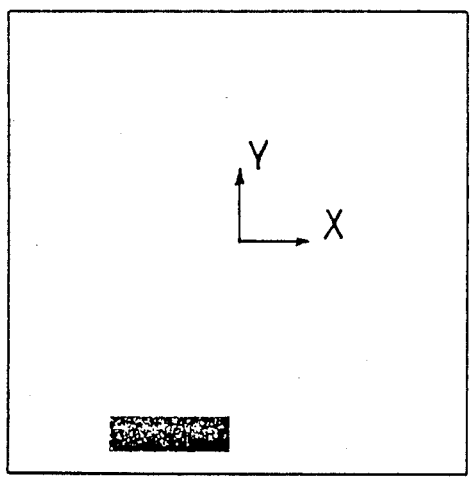
Figure 2C:
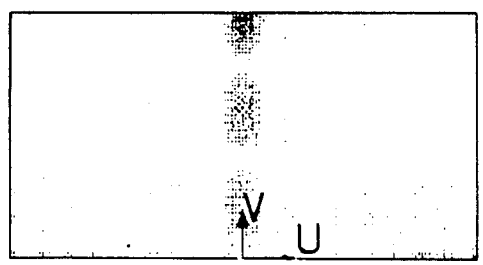
Figure 2D:
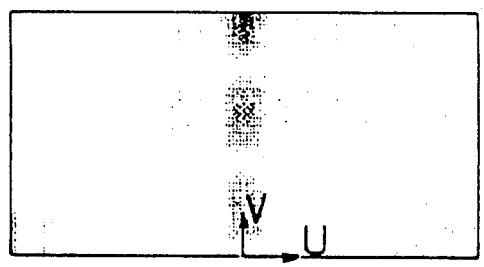

That information is illustrated by FIGS. 2A-4D reproducing expressed screen image representations (amplitude represented as blackening). Thus FIG. 2A and FIG. 2B show two position-displaced image contents M (x,y) in the original image plane (x/y-plane). FIGS. 2C and 2D show the respectively associated amplitude matrices A (u, v) after carrying out the two-dimensional Fourier transformation operation, as are represented in the intermediate storage means 4 in the u/v-plane. It will be seen that the representations in FIGS. 2C and 2D are identical, that is to say the positional shift in the x/y-plane has no influence on the amplitude matrix in the u/v-plane (positional invariance).

Figure 3A:
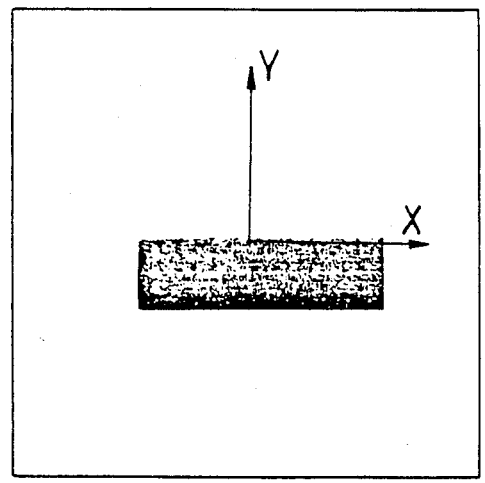
Figure 3B:
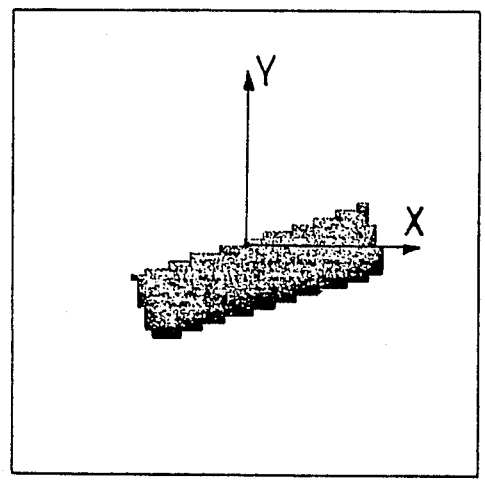
Figure 3C:
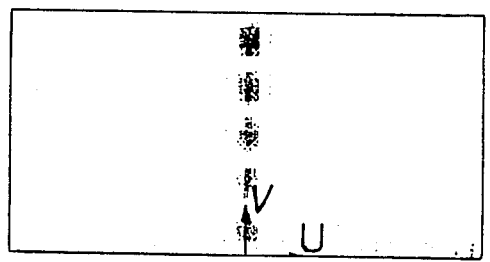
Figure 3D:
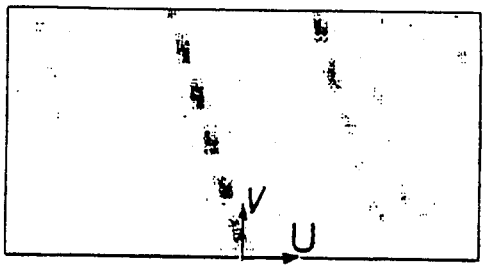
Figure 4:
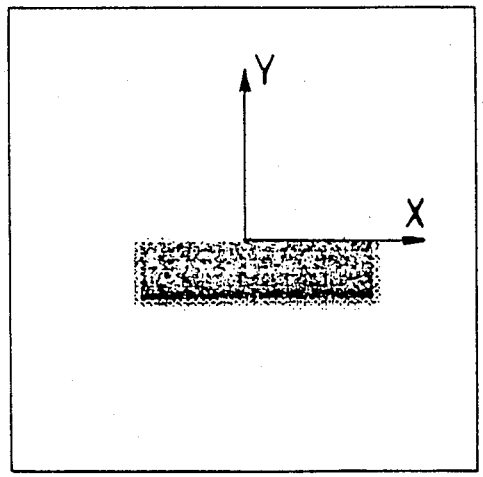
Figure 4:
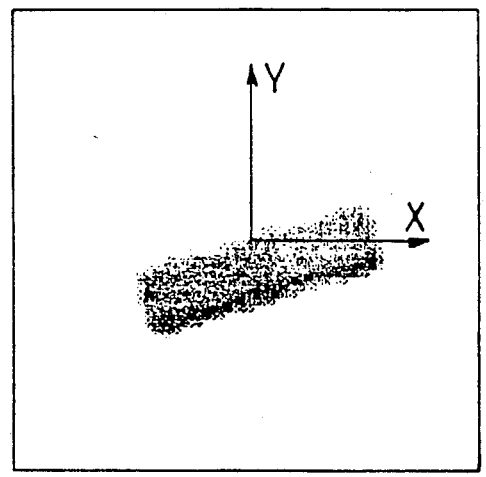
Figure 4:
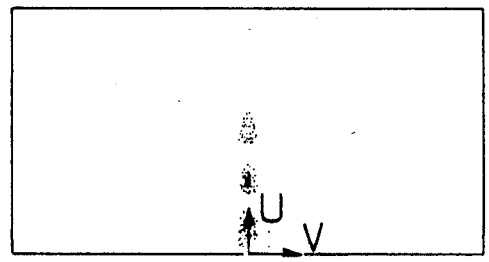
Figure 4:
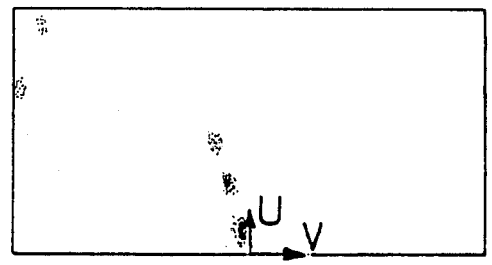

FIGS. 3A and 3B show the same rectangle M (x,y) in the x/y-plane as FIG. 2A, but increased in size by the factor 2, while in addition in FIG. 3B the rectangle is turned or twisted relative to the rectangle in FIG. 3A, in the x/y-plane. FIGS. 3C and 3D show the amplitude matrices A (u,v) associated with the image contents (rectangles) of FIGS. 3A and 3B, wherein a comparison between FIGS. 2A and 3A on the one hand and FIGS. 2C and 3C on the other hand shows the inversely proportional increase in size (that is to say reduction) in the image in the u/v-plane relative to the image in the x/y-plane; from a comparison between FIGS. 3A and 3B on the one hand and FIGS. 3C and 3D on the other hand, there directly follows the equivalent twist or rotation of the amplitude matrix in the u/v-plane upon image rotation in the x/y-plane, more particularly by the same angle of rotation in each of the two planes.

FIGS. 4A-4D show a realistic representation of the straight and the twisted or turned rectangular bar shown in FIGS. 3A and 3B together with transformation into the u/v-plane, that representation corresponding to the image produced by a video camera (edge smoothing). The amplitude matrices A (u,v) shown in FIGS. 4C and 4D, which are derived from the images in FIGS. 4A and 4B, particularly in the twisted or turned situation (FIG. 4D), no longer suffer from the edge disturbances which occur in FIG. 3D (due to successively sharp edge rastering in FIG. 3B). As in the continuous case, the following addition and linearity theorem also applies in the case of discrete Fourier transformation, in the complex mode:

$$F(A_1+A_2)=F(A_1)+F(A_2), \; F(c\cdot A_1)=c\cdot F(A_1)$$

In the pattern of the amplitude matrix of the u/v-plane the two search dimensions "position in the x-direction" and "position in the y-direction" are separated off (they are contained exclusively in the $\phi$-matrix) while article identification, determination of size (which can optionally be interpreted directly as distance or range) and determination of twist or rotation can be hereafter ascertained without reduction in quality even in regard to a plurality of article patterns which are displaced in any fashion.

Of the five search dimensions article identity (identity of an image content or portion), magnification (possibly corresponding to distance), twist, position in the x-direction and position in the y-direction, the first three parameters can now be completely separated from the last two and determined in a decoupled manner.

The Fourier transformation operation also provides that local disturbances in the image plane produce effects solely in the amplitude values at higher frequencies. For example the amplitude matrices of two equally proportional, equally turned and equally large rectangles of which one has rounded corners differ only at the higher frequencies.

When illustrated in the x/y-plane, corresponding to discrete Fourier transformation is the breakdown of a pattern which is in the x/y-plane, into transverse sources which pass over the image with different amplitudes, frequencies and directions of movement, and produce the image by the summing thereof. The directions of movement all occur in a grid of point-to-point connections which can be drawn in. All combinations of the fundamental wave and harmonics which are perpendicular to each other occur at frequencies. Now, the amplitude spectrum or matrix which is being analysed, possibly containing a plurality of any articles which suffer disturbance (for example in the case of a workpiece, those with partially masked or damaged edges), is to be compared by means of rotary extension with the amplitude spectra or matrices of the reference objects, previously stored in the reference storage means 6, 7 and 10 respectively. In order to be able to carry out that comparison operation, advantageously a transformation operation for transforming the orthogonal amplitude matrix into a polar matrix is firstly carried out, a logarithmic scale being selected for the radius. As a result increase/reduction in size of an article degenerate in the image space into a shift or displacement (computing cursor effect). That transformation operation is carried out in the conversion stage 8 in accordance with the following formulae:

$$F(u,v) \rightarrow F(r,\alpha),$$
$$u = R \cos \alpha$$
$$v = R \sin \alpha$$
$$R = k_1 e^{k_2 \cdot r}$$

Then a discrete two-dimensional right-angled correlation is effected in respect of the amplitude matrix contained in the intermediate storage means 9 in logarithmic polar coordinates, with the reference amplitude matrices which can be selected from the reference storage means 10, wherein the identity probability matrix or correlation matrix $K(x,y) = A_1 \otimes A_2(x,y) = \Sigma_{x'}, \Sigma_{y'}, A_1(x'-x, y'-y).A_2(x',y')$ is ascertained.

That correlation step is carried out in the correlation stage 11 whose inputs receive the amplitude matrix A ($r_1, \alpha$), represented in logarithmic polar coordinates $r_1$, $\alpha$, of the actual image detected by the camera 1, from the intermediate storage means 9, and a selectable amplitude matrix $A_{Ref}^1$ ($r_1, \alpha$), $A_{Ref2}$ ($r_1, \alpha$) ... which is also represented in logarithmic polar coordinates $r_1$, $\alpha$, from the reference storage means 10.

As already stated, comparison in respect of magnification becomes a comparison in respect of displacement or shift, as a result of the logarithmic radius scale, wherein the twist angle $\alpha$ of the article, in the original x/y-plane, is not influenced.

If the logarithmic polar coordinates are plotted on a right-angled coordinate system (see for example FIGS. 6E–6G which will be described in greater detail hereinafter), the rotary extension or rotary shift of the reference amplitude matrix, which is to be performed in the correlation operation, degenerates into two linear shifts or displacements along the $r_1$- and $\alpha$-axes. Therefore each twist-magnification comparison (rotary extension) becomes a shift comparison (computing cursor effect).

Figure 7:
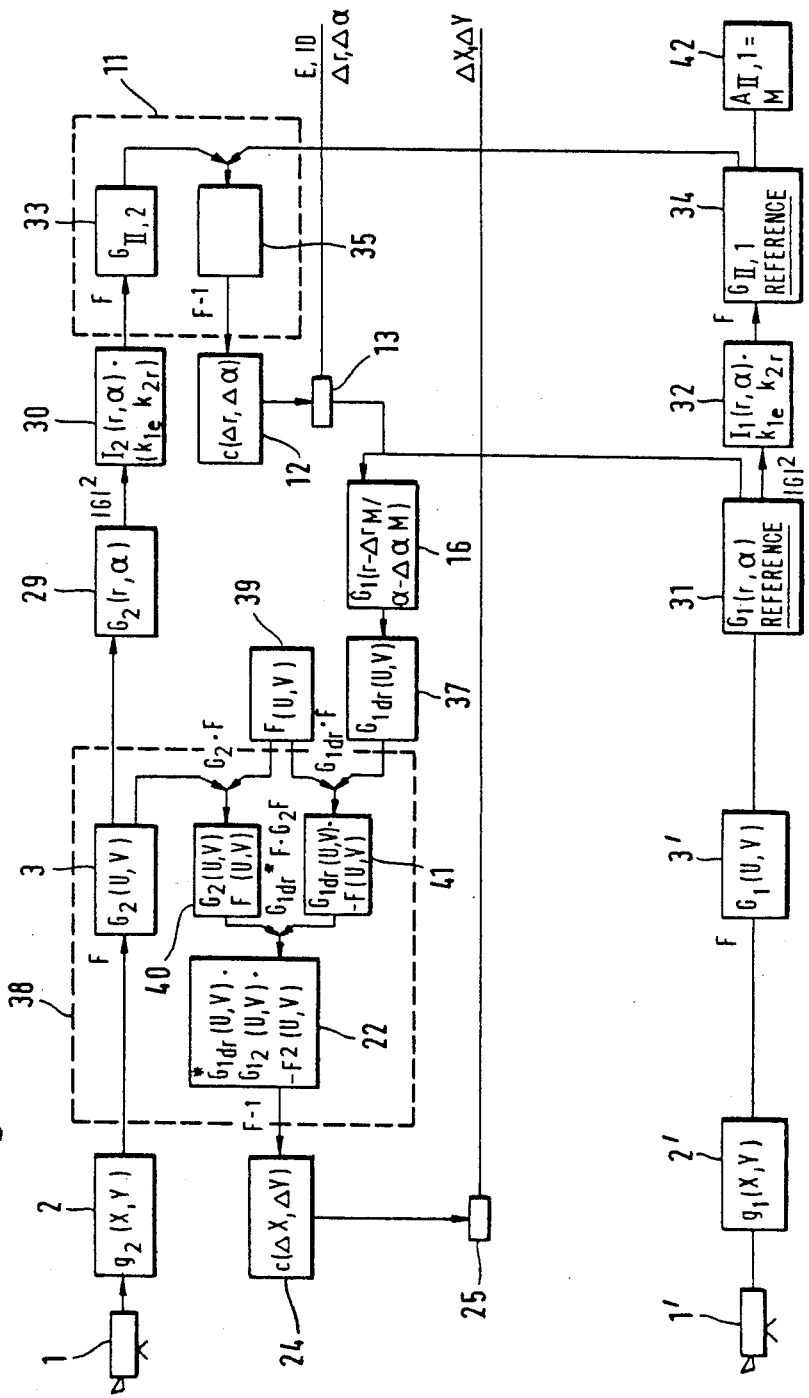
FIG. 7 shows a block circuit diagram of a further embodiment of a system for carrying out a process according to the invention.

Instead of the amplitude matrices A($r_1, \alpha$) and $A_{Refl}$ ($r_1 \alpha$) which are subjected to the correlation step, it is also possible, as will be described in greater detail hereinafter with reference to FIG. 7, to use the corresponding power matrices (that is to say the squared amplitude matrices). That enhances the quality of the correlation result. For that purpose for example a squaring stage may be connected on the input or output side of the conversion stage 8.

The two-dimensional correlation matrix K($\Delta r, \Delta \alpha$) which is stored in the intermediate storage means 12 already represents the result of the correlation. That correlation matrix may be illustrated in the form of an undulating surface, which is extended over the $\Delta r$, $\Delta \alpha$-plane, with one or more apex-like maxima. That maximum or maxima is or are detected with the stage 13 for maximum searching and the maximum amplitude which represents the identity probability $w_1$ of the actual image content and the reference pattern as well as the associated values $\Delta r$ in respect of magnification relative to the reference pattern and $\Delta \alpha$ in respect of twist relative to the reference pattern are stored in the intermediate storage means 14. For the purposes of classification of the maxima in respect of pattern similarity, it is possible to use not just the height of the correlation maxima but also the relative steepness thereof. Advantageously it may be provided in that respect that, in order to determine the relative steepnesses of the correlation maxima of the correlation matrix, they are subjected to Fourier transformation in logarithmic and two-dimensional mode whereupon the resulting two-dimensional spectrum is preferably multiplied by an O-phase filter in an element-wise manner by the spacing of the respective pair of Fourier variables from the origin of the Fourier plane and then that new spectrum is subjected to a Fourier back-transformation operation, wherein the amplitude maxima of the resulting matrix are a direct measurement in respect of the relative steepness of the correlation maxima of the correlation matrix. In simpler situations however simple evaluation in respect of height of the correlation maxima may also be sufficient.

The result of each amplitude (reference pattern/actual image)-correlation operation is thus already as follows:

Article identification: probability $w_1$, $w_2$ ... of the article being included—that substantially corresponds to the amplitude of the individual correlation maxima.

Any sufficiently high and possibly sufficiently steep maximum already determines magnification $\Delta r_1$, $\Delta r_2$ .. . $\Delta \alpha_1$, $\Delta \alpha_2$, ... by virtue of its position. Still indeterminate is the number of identical articles which are to be found with the present magnification and twist. (If a plurality of maxima each having associated $\Delta r$ and $\Delta \alpha$-values occur in relation to the same category of a reference pattern, for example a triangle, then a plurality of triangles of different sizes and/or in different states of twist are present in the x/y-plane).

Local defects in the articles or image contents in the image here primarily result in a reduction in the maximum value, but not a shift in the maximum.

Depending on the function to be performed, it is even possible for such disturbances or faults to be eliminated directly after Fourier transformation by selective reduction in amplitude (for example: workpiece recognition in spite of surface defects versus defect recognition; that is to say, in spite of having a damaged or covered edge, a rectangular workpiece is recognised as a rectangular workpiece, or certain kinds of edge damage can be recognised or classified, irrespective of the respective form of workpiece involved).

Utilising that characteristic, in order to reduce the number of correlation operations required for identification of an image content or portion (comparison of the actual image with various stored reference patterns in order to ascertain the best probability of identity), it is possible, as already mentioned, to operate on a hierarchical basis; that is to say the actual images can be identified by association with increasingly differentiating reference pattern classes (for example first a comparison as to whether what is involved is a face with general proportions of a face such as eyes, oval outline, etc., then when a correlation is found, calling up possibly further sub-divided portrait data).

As now size, twist and image content identity are established, the position of the image content or portion in the original image plane is now also to be ascertained.

In that case, the correlation theorem (convolution theorem) is advantageously applied:

$$S_1 \otimes S_2(x,y) = F^{-1}\{F[S_1] \cdot F^*[S_2]\}$$

Therein $S_1$ and $S_2$ are two general two-dimensional functions or value matrices in the x/y-plane of which for example $S_1$ corresponds to the actual image and $S_2$ corresponds to the reference pattern in the image plane. The Fourier transform of the function $S_1$ corresponds to the complex matrix A(u,v), $\phi$(u,v) of the actual image in the Fourier plane which is already present in the intermediate storage means 4 and 5. The Fourier transform of the function $S_2$ corresponds to the complex matrix A(u,v), $\phi$(u,v) of the reference pattern which is also already in the reference storage means 6 and 7 and which indeed must be subjected to inverse rotary extension in the stage 15 with the $\Delta r$- and $\Delta \alpha$-values stored in the intermediate storage means 14; the complex reference matrix when subjected to inverse rotary extension in that way is stored in the intermediate storage means 16.

The complex reference matrix stored in the intermediate storage means 16 is now multiplied in conjugated complex element-wise manner in the multiplication stage 21 by the complex article matrix stored in the intermediate storage means 4 and 5 and the complex product obtained in that way is stored in the intermediate storage means 22.

The stages 17–20 which are connected into the signal path for the amplitude matrices are not absolutely necessary from the functional point of view and the purpose thereof will be described in greater detail hereinafter.

After applying discrete two-dimensional Fourier back-transformation in the stage 23 to the complex product contained in the intermediate storage means 22, that already gives the correlation result stored in the intermediate storage means 24, in the form of the correlation matrix K($\Delta x, \Delta y$) which corresponds to the left-hand side of the last-specified equation (correlation theorem). As the Fourier transforms set out on the right-hand side of the equation are essentially already stored in any case, use of the correlation theorem means that a considerable number of computing steps are saved (which is an advantage in regard to time). The two-dimensional correlation matrix obtained is investigated in stage 25 for maximum searching for one or possibly also a plurality of maxima (the latter in the case of a plurality of similar articles of equal size and equal twist and various locations in the x/y-plane—in that case there is only one maximum in the first correlation operation, stages 11–13, but a plurality of maxima in the second correlation operation, stages 21–25), wherein the coordinate values found in respect of the maximum (or maxima) represent the position of a previously selected reference point on the image portion (for example the intersection of diagonals in a rectangle) in the x/y-plane. Stage 25 therefore directly supplies the $\Delta x$, $\Delta y$-values by which the position of the reference point of the actual image portion is shifted relative to the axis system of the original image.

Those values are brought together with the values for $\Delta r$ and $\Delta \alpha$, which were produced by the first correlation operation (in stage 11), in the result processing stage 27 and are subjected to processing (in which respect in particular the shift value $\Delta r$ representing the increase in size in the logarithmic polar axis system is converted into a scale enlargement or reduction value $\Delta S$).

Then, for any actual article (general index i) the coordinate values $\Delta x_i$, $\Delta y_i$, the value $w_i$ in respect of identity probability, the magnification or reduction value $\Delta S$ and the twist angle $\Delta \alpha$ relative to the normal reference position are listed or printed out in the printer 28.

In order to avoid inaccurate correlation results (stage 24) in the event of absence of surface structuring of the article patterns, for example the O-phase filters 17–20 with proportional-differential characteristic (corresponding to distortion-free contour accentuation) may be provided. Such an incorrect correlation result could occur for example when a structureless triangular article is brought into alignment with an also structureless circular reference article (wherein the circle would have to be at least an enclosing circle for the triangle); the correlation maximum which occurs in that case would be of precisely the same magnitude as that which occurs when two identical structureless triangles are superimposed. That error would naturally not occur when the circle or the triangle had a surface structure. When two triangles are superimposed, with contour accentuation, on the other hand there is a very strong maximum in the correlation result K($\Delta x, \Delta y$).

In the present case an O-phase filter can be easily produced by frequency-dependent amplitude value accentuation in the amplitude matrices of the image spectrum or reference image spectrum (compare the O-phase filters 17 and 19 in FIG. 1 with respectively downstream-disposed intermediate storage means 18 and 20 for the amplitude matrix with accentuated contour amplitude values).

Figure 5A:
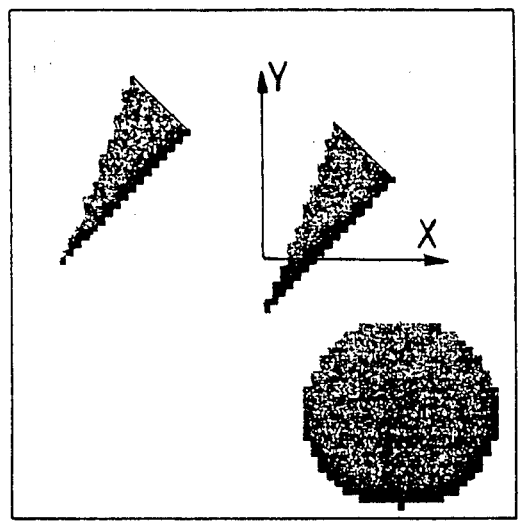
Figure 5B:
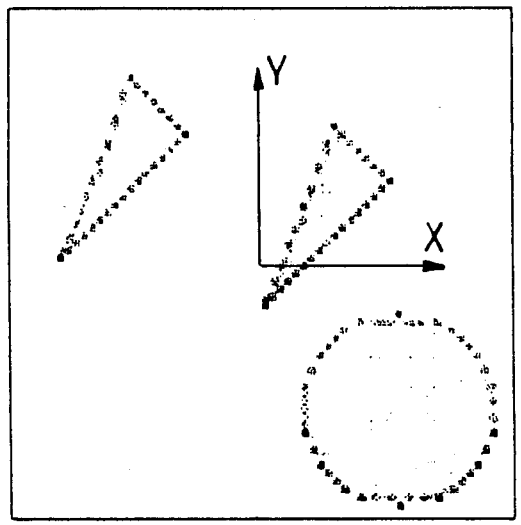

FIGS. 5A and 5B are to illustrate the optical effect of such contour accentuation. FIG. 5A shows an image matrix M (x,y) with two structureless triangles and a likewise structureless circle. FIG. 5B shows the effect of an O-phase filter applied to FIG. 5A when transformed into the Fourier plane, more specifically FIG. 5B corresponding to the Fourier reverse transformation of the matrix $\widetilde{A}(u,v)$ with the original phase matrix $\phi(u,v)$ into the image plane M(x,y). That means that FIG. 5A was transformed into the u/v-plane, there subjected to the action of an O-phase filter and transformed back to the x/y-plane again.

Although such O-phase filters produce improvements in regard to the clear distinguishing of a maximum in particular in the second correlation operation (stages 21–25), the use of such O-phase filters may also give an improvement in the first correlation operation (stages 11–13), as will be described in greater detail hereinafter in relation to the description of FIG. 7.

The only ambiguity still involved in the article twist through 180° (the amplitude spectrum or matrix has a periodicity of 180°) can be determined by further inverse Fourier transformation of the product, produced in stage 21, of the image spectra, with a rotary-extension reference spectrum which is additionally turned through 180°. In other words, the procedure involves double reverse transformation from the u/v-plane into the x/y-plane, while the inverse rotary extension performed in stage 15 is performed once with the values $\Delta r$, $\Delta \alpha$ and on the second occasion with the values $\Delta r$, $\Delta \alpha + 180°$. Then the two correlation results K($\Delta x, \Delta y$) are compared together and in that way it is possible clearly to specify the position of the actual image content or portion in the x/y-plane.

Figure 6A:
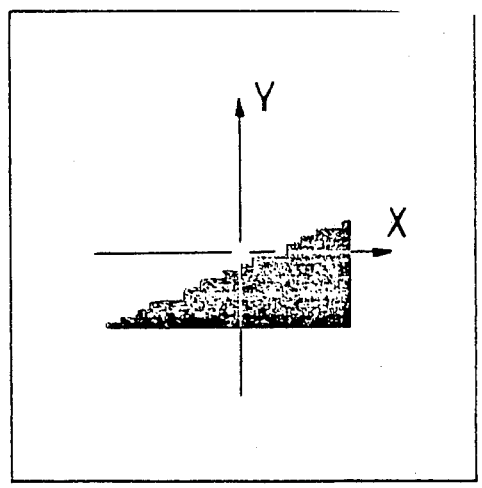

An example of an identification and search operation according to the invention will now be briefly described with reference to FIGS. 6A–6D:

FIG. 6A shows a matrix M (x,y) (in the intermediate storage means 2 in FIG. 1) with image content "triangle" in the x/y-plane as the reference pattern in a normal position which in a learning operation can be read into a respective one of the reference storage means 6, 7 in the u/v-plane and one of the reference storage means 10 in the $r_1/\alpha$-plane.

Figure 6B:
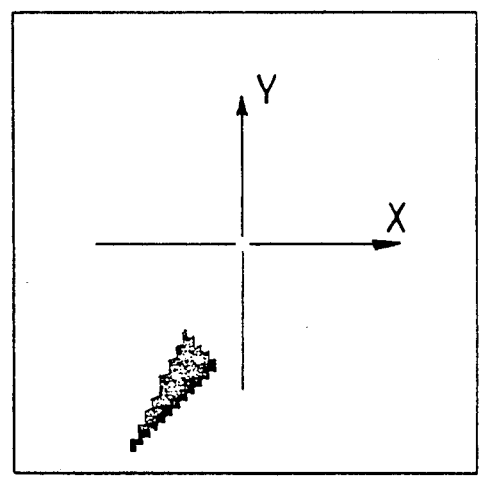

FIG. 6B shows a matrix M(x,y) (in the intermediate storage means 2 in FIG. 1) as an image to be identified in the x/y-plane. The triangle was turned through 45° relative to the normal position, reduced on a scale of 2:1 and shifted in respect of position.

Figure 6C:
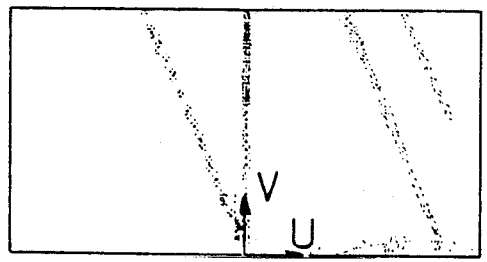

FIG. 6C shows the amplitude matrix A(u,v) (in the storage means 7, reference 1 in FIG. 1) of the reference pattern M(x,y) in FIG. 6A, which is subjected to two-dimensional Fourier transformation.

Figure 6D:
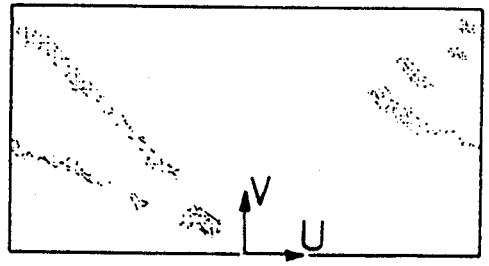

FIG. 6D shows the amplitude matrix A(u,v) (in the intermediate storage means 4 in FIG. 1) of the matrix M(x,y) in FIG. 6B, which is subjected to the same two-dimensional Fourier transformation operation; clearly visible is the increase in width of the line patterns in the u/v-plane as a result of the reduction of the triangle in the x/y-plane, and the twist of the line pattern in FIG.

6D relative to that shown in FIG. 6C to the same extent (45°) as the twist of the triangle in FIG. 6B relative to the position in FIG. 6A (the increase in length which can also be seen in the line patterns in the u/v-plane in the direction of the line as a result of the reduction in size of the triangle in the x/y-plane is not discernible in the absence of structural details, but reference is made in respect thereof to FIGS. 2A–2D on the one hand and FIGS. 3A–3D on the other hand).

Figure 6E:
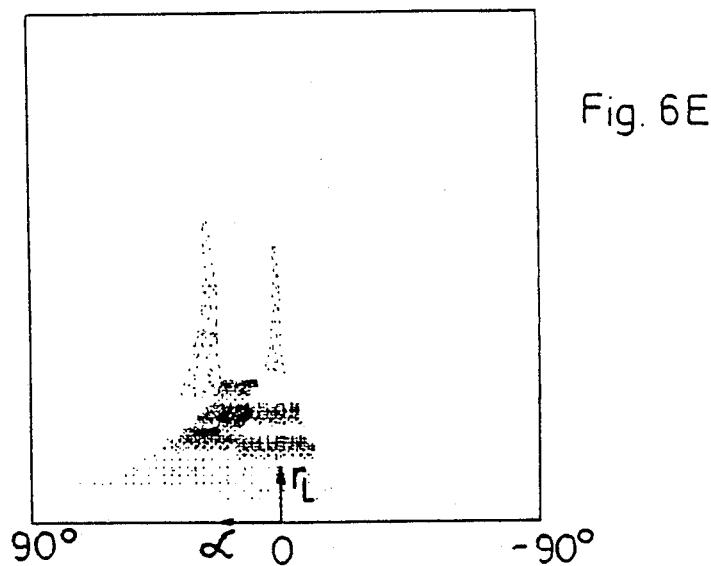
Figure 6F:
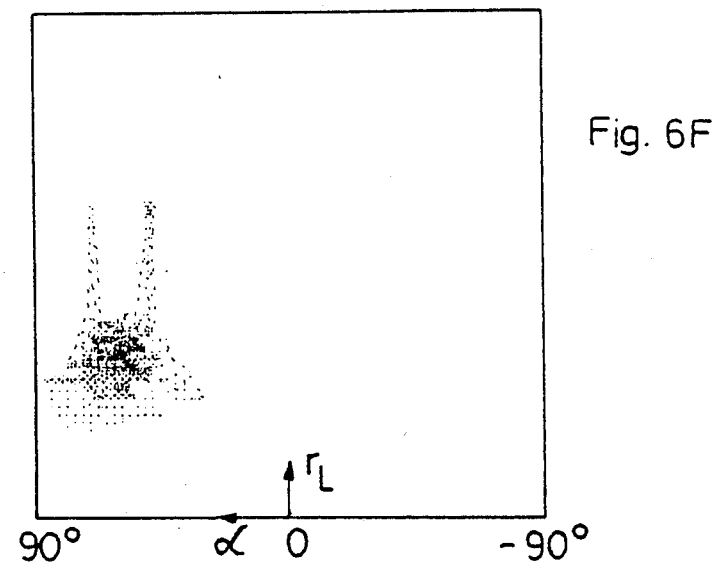

FIG. 6E shows the reference amplitude matrix $A(r_1,\alpha)$ in the reference storage means 10, that is to say after transformation, in the conversion stage 8, of the amplitude $A(u,v)$ into logarithmic polar coordinates. FIG. 6F shows the amplitude matrix $A(r_1,\alpha)$ of the image to be identified, said matrix being similarly transformed into logarithmic polar coordinates and stored in the intermediate storage means 9; the coordinates $r_1$ and $\alpha$ are plotted on an orthogonal axis system.

Comparison between FIG. 6F and FIG. 6E shows the shift of the amplitude matrix in FIG. 6F relative to the reference amplitude matrix both in the direction of the $r_1$-axis (=reduction in the size of the triangle to be identified, as shown in FIG. 6B, relative to the reference pattern shown in FIG. 6A) and also in the direction of the $\alpha$-axis (=twist of the triangle as shown in FIG. 6B relative to the reference pattern as shown in FIG. 6A).

If the two amplitude matrices of the reference pattern and the image to be analysed were recorded in a polar coordinate plane with non-logarithmic r-scale but orthogonal axis system as in FIGS. 6E and 6F, then the representation along the $\alpha$-axis would be the same as in FIGS. 6E and 6F but the representation along the r-axis, instead of a parallel shift in the r-direction, would be an extension or stretch in the r-direction.

Therefore the main advantage of the logarithmic r-scale is that articles of different sizes or at different distances from the camera always give equal-size amplitude matrices in the orthogonal $r_1,\Delta\alpha$-system. That substantially facilitates correlation comparison.

Figure 6G:
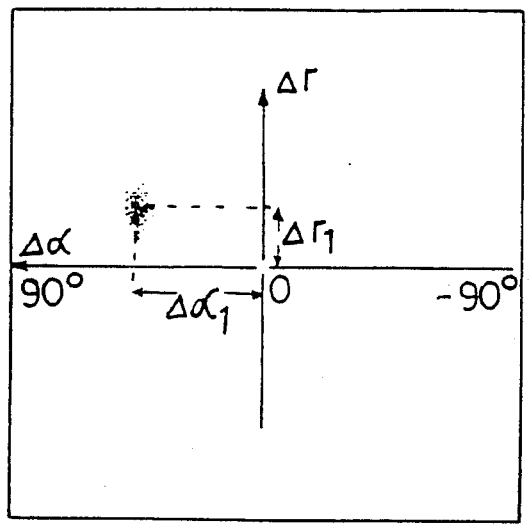

FIG. 6G represents the correlation result $K(\Delta r,\Delta\alpha)$ present after the correlation stage 11 in the intermdiate storage means 12; there is only one maximum in the top left quadrant which is detected in the stage 13 for maximum search. The amplitude of that maximum reproduces the probability value $w_1$ in respect of identity probability of image content to be identified and reference pattern while the position of the maximum in the $\Delta r,\Delta\alpha$-axis system is precisely in conformity with the assumptions of FIGS. 6A and 6B: reduction in size of the image content to be identified by a factor $\Delta r_1$ and twist through $\Delta\alpha_1$ relative to the reference pattern.

It will be appreciated that the initially still unknown image to be identified must first be successively correlated with all reference articles contained in the reference storage means and that only the highest amplitude value, which is achieved in that operation, in respect of the correlation peak $K(\Delta r,\Delta\alpha)$ (that is to say the greatest w-value) fixes the identity of the article to be identified. In order to save time, that search operation may also be carried out in a hierarchical order (arrangement in accordance with general coarse classification features and increasing refinement in respect of classification in sub-groups).

Figure 6H:
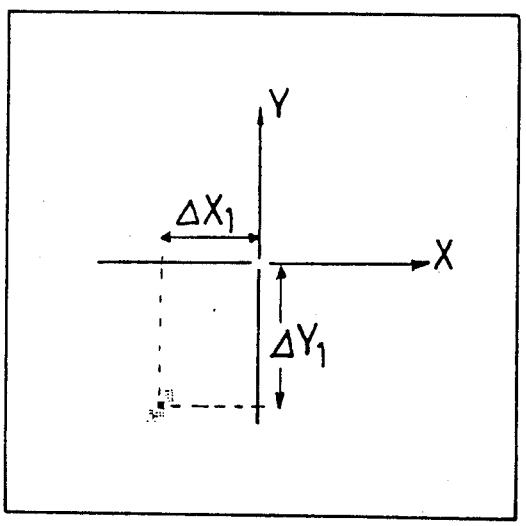

FIG. 6H already shows the result $K(\Delta x,\Delta y)$, which is to be found in the intermediate storage means 24, in respect of the second correlation operation for positional determination. As already stated, for that purpose the complex matrix of the reference article is taken from the reference storage means 6 and 7 which are present in any case, subjected to inverse rotary extension with the values in respect of $\Delta r_1$ and $\Delta\alpha_1$ (stages 15 and 16) and multiplied in conjugated complex mode with the complex matrix of the actual article (stages 21 and 22). The subsequent two-dimensional Fourier reverse transformation operation (stages 23 and 24) already gives, due to the position of the correlation maxima:

The position of the identified image content (x/y-value), that is to say the search dimensions which have been previously separated off, as well as any multiple occurrence of equal-size, parallel-displaced articles in the x/y-plane.

In the case considered in FIG. 6H the coordinate values $\Delta x_1$, $\Delta y_1$ of the single maximum found by the maximum search stage 25 in the correlation result $K(\Delta x,\Delta y)$ give those values by which for example the reference point (approximtely corresponding to the point halving the longest side of the triangle) of the reference pattern must be displaced in the x/y-plane (image plane) in order to coincide with the reference point of the actual image content sought (as shown in FIG. 6B), or vice-versa.

If in specific situations, due to the function to be produced, the article distance (size) cannot vary (table distance known, no stacking, that is to say scale known) and non-similar articles of different scales, that is to say articles of different sizes of the same kind, for example triangles of different sizes, may occur, two-dimensional polar correlation of the amplitude spectra degenerates into one-dimensional correlation in respect of twist.

A similar situation applies in regard to fixed predetermination of a positional coordinate for the positional correlation.

When dealing with video image analysis, in a three-dimensional situation, an option which presents itself is the use of two or more locally separately positioned recording systems, for example cameras, and direct comparison of the results or, in the event of adequate article properties or characteristics, that is to say significant characteristics by means of which the article can be recognised, the use of only one recording system. In both cases the reference library must include all relevant article views as the way in which the recording system will detect the article is not originally known from the outset.

The embodiment shown in FIG. 7 of a system for carrying out the process according to the invention differs from the system illustrated in FIG. 1 essentially by virtue of the following features which will be discussed in greater detail hereinafter: use of power (and not amplitude) after the first Fourier transformation operation, the use and storage of complex matrices without separate division into real amplitudes and phase matrix, accentuation of power with the square of the spatial frequency in the Fourier range and subsequent performance of the first correlation operation for identification and rotary extension determination, in accordance with the correlation theorem (convolution theorem).

An article to be analysed is recorded by way of a video camera 1 and the image distribution thereof in the image plane (x/y-plane) is stored in the form of a two-dimenensional matrix $g_2(x,y)$ in the intermediate storage means 2. The system includes a stage 3 for carrying out a two-dimensional Fourier transformation operation. The complex image matrix obtained in that way in the Fourier range is identified by $G_2(u,v)$. A real power spectrum is now to be obtained therefrom, more particularly not in dependence on Cartesian spatial frequency coordinates $(u,v)$ but in dependence on polar coordinates which are logarithmic in respect of the radial coordinates, in order to be able to carry out a subsequent rotary extension correlation operation by virtue of two linear displacement correlation operations. The use of the power matrix instead of the amplitude matrix used in FIG. 1 gives the advantage that, with a plurality of different image contents or portions which are contained in an image, valid additivity is maintained in the complex, down to additive interference factors, in which respect it is precisely in such additive interference factors that the information regarding the relative position of the individual image content portion occurs and that information must therefore be maintained as a characteristic of the image content.

When changing over to semi-logarithmic polar coordinates which in turn form a right-angled grid, interpolation operations are necessary. In that connection it should be noted that there is no constant resolution in the logarithmic r-direction. The Shannon sampling theorem ("the highest frequency which can be sampled with N support locations is N/2") can be fulfilled in respect of all r-values in that the resolution with the maximum r-value is still at least equal to the resolution in the Cartesian u/v-grid (for lower r-values it is then higher).

A squaring operation is necessary to obtain the power matrix. In principle it would be possible to envisage obtaining the power matrix by squaring the amplitude matrix of the matrix $G_2(u,v)$ over the Cartesian grid. It should be noted in that respect however that a Cartesian power matrix obtained in that way has a frequency content up to double the amplitude matrix, which, when complying with the Shannon theorem, in the interpolation for coordinate conversion into semi-logarithmic polar coordinates, would require double the number of support locations. It is therefore better for the real and imaginary portions of the image matrix $G_2(u,v)$ to be converted in the stage 21 to semi-logarithmic polar coordinates and to obtain the desired power matrix $I_2(r,\alpha)$ by subsequent absolute squaring.

In the case of a stochastically distributed image content (for example the image content of an image grey value storage means) the envelope curves of the amplitude spectra fall off in the Fourier space at 1/spatial frequency. If all spatial frequency constituents of the image to be analysed are to be correlated in equally valued mode, it is therefore necessary to provide for amplitude accentuation with the spatial frequency or power accentuation with the square of the spatial frequency, which is performed by means of zero phase differentiation in the stage 30.

The video camera 1' records the reference pattern $g_1(x,y)$ which is then stored in the intermediate storage means 2' (image plane) and which is processed in the stages 3', 31 and 32 in a similar manner to the image matrix $g_2(x,y)$ in the stages 3, 29 and 30.

The correlation stage 11 serves to determine the correlation matrix $C(\Delta r, \Delta\alpha)$ by correlation of the power matrix of the image with that of the reference pattern, wherein the correlation matrix is put into intermediate storage in the storage means 12 and the maximum (or maxima) thereof, by virtue of its or their height and relative steepness, indicates or indicate the probability with which the reference pattern matches an image content or portion of the image to be analysed while the maximum (or maxima) thereof, by virtue of its or their position, indicates or indicate the twist or twists and the enlargement or enlargements with which the reference pattern occurs in the image. Correlation is effected by way of the convolution theorem by the power matrices of the image and the reference being subjected in the stages 33 and 34 respectively to a further Fourier transformation operation, with the resulting matrices $G_{II,1}$ and $G_{II,2}$ being multiplied together in conjugated complex mode and the product being subjected to Fourier reverse transformation (stage 35).

The maxima of the correlation matrix are classified in the maximum detector 13 and the position $\Delta r$ and $\Delta\alpha$ thereof are determined (corresponding to the reduction in size and twist of the image content relative to the reference pattern).

As a secondary result, an amplitude distribution of the pattern M, which is independent in respect of position, twist and size is obtained in the output stage 42, by amplitude formation of the matrix $G_{II,1}$ of the reference pattern, which is obtained by double Fourier transformation.

For the purposes of complete analysis of the image, it is still necessary to establish where the image content which is identical in terms of content to the reference pattern is to be found in the original image, for which purpose the second correlation stage 38 is used. The reference pattern which is inversely shifted in the stage 16 with a set, established in the maximum detector, of twist $\Delta\alpha$ and enlargement $\Delta r$, in polar coordinates, is subjected to reverse interpolation in the interpolation stage 37 to Cartesian coordinates (matrix $G_{1ar}(u,v)$). Before that complex matrix $G_{1ar}$ of the reference is correlated with the complex matrix $G_2(u,v)$ of the image by conjugatedly complex multiplication and then Fourier reverse transformation (stage 22), the two matrices $G_{1ar}$ and $G_2$ are multiplied with a real 0-phase filtering matrix whose matrix elements increase in value with the distance from the origin of the underlying Fourier variable coordinate system.

The contour-accentuated matrices are put into intermediate storage in the storage stages 40 and 41 respectively. The correlation matrix $C(\Delta x, \Delta y)$ obtained in accordance with the convolution theorem is stored in the storage means 24 and the maximum detector is used to investigate for maxima, the maximum or maxima indicating where the image content being sought is to be found in the image to be analysed.

In order to achieve improved separability in the case of a high extraneous structure component in the image to be analysed, elements of the real reference matrices which are below a given value may be completely zeroed.

Figure 8:
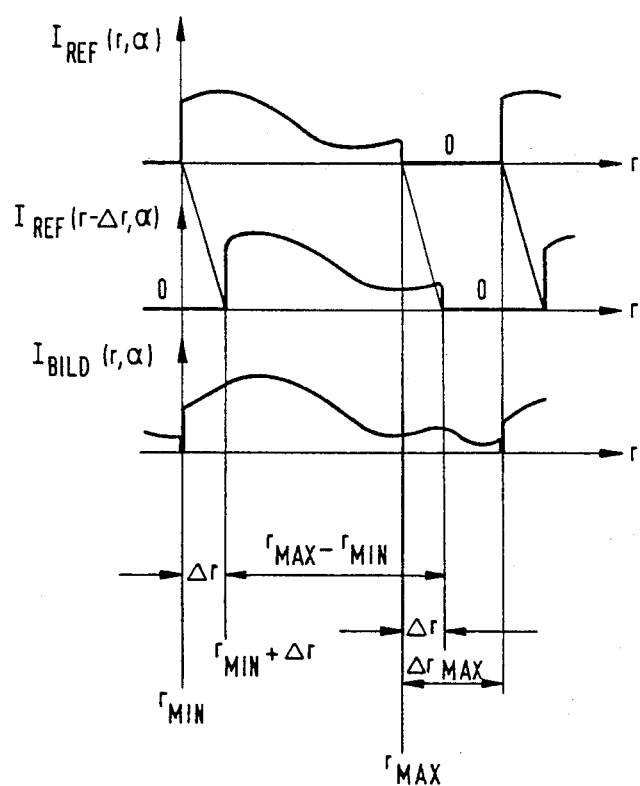
FIG. 8 is a one-dimensional section in the radial direction through spatial frequency spectra, represented in logarithmic polar coordinates, in the Fourier range.

FIG. 8 represents values in respect of the intensity matrix $I_{ref}(r,\alpha)$ and $I_{ref}(r-\Delta r,\alpha)$ of the reference and the values of the intensity matrix $I_{BILD}(r,\alpha)$ of the image are plotted as continuous lines as a function of the logarithmic polar coordinates for fixed polar angles. For the purposes of correlation of the reference power matrix with the image power matrix, the reference power matrix is shifted relative to the image power matrix and product formation is used to establish the extent to which the shifted reference power matrix coincides with the image power matrix, with the respective shift in question. In regard to a shift in the direction of the polar angle $\alpha$, due to the periodicity of the power matrices, in that direction, there are no problems involved, so that the angle α is retained for improved representation in FIG. 8. That periodicity is initially missing in the logarithmic r-direction. In order nonetheless to arrive at a correct correlation result on an effective correlation width which is to be determined by the difference between a given upper value $r_{max}$ and a given lower value $r_{min}$ of the logarithmic radius scale, in the unshifted reference power spectrum $I_{ref}(r,\alpha)$ in FIG. 8 (upper curve), above the above-mentioned value $r_{max}$, the values of the reference power spectrum are set to zero over a width which corresponds to the maximum shift $\Delta r_{max}$ being considered (that is to say the maximum reduction in size considered in the reference), while that is not the case in the image power spectrum $I_{BILD}(r,\alpha)$. It is therefore possible to produce a quasi-periodicity in the r-direction, in that the values which disappear on the right upon a shift in the reference power spectrum by $\Delta r$ (corresponding to a reduction in size of the reference pattern) in FIG. 8 (top) re-appear on the left in FIG. 8 (at the centre). As those values are zero for $\Delta r < \Delta r_{max}$, the products with the unshifted image intensity matrix $I_{BILD}(r,\alpha)$ also give zeroes and do not falsify the correlation result. Because on the other hand in the image power spectrum values are still drawn to r-values which are above $r_{max}$, although the effective correlation width is shifted in the r-direction, it is however of a constant width, irrespective of the shift $\Delta r$.

Examples of possible uses of the process according to the invention and the system according to the invention will now be set out.

Firstly, examples in the field of optical image recognition are to be set forth:

Robotics:

For precise positioning of gripping arms which are generally non-perceptive in relation to randomly arranged workpieces, it is necessary to provide for precise article location and judgment in respect of the position of the adjacent articles, even if what is involved there are pieces of the articles which have not been seen previously (and same first have to be removed from the field of operation).

A development could provide for example that the robot grips a packing case after recognition and positional determination, begins to seek the label on the individual sides of the cases, and recognises and reads the clear text, irrespective of the way in which it is oriented or distorted (similarly to fading out a disarranged or fault-ridden image edge in the u/v-plane). The process according to the invention is in that case performed a plurality of times, in stepwise succession.

That therefore also affords the first basic conditions for implementing a certain degree of autonomy in robots.

In the same direction of development is for example the automated librarian which can read a wide range of scripts (such scripts must obviously all be included in the reference library). Each letter is detected, subjected to two-dimensional Fourier transformation, and so forth, in accordance with the process of the invention. It is also possible for example to investigate where the letter "a" occurs anywhere on a page of writing, and so forth.

Image evaluation:

All image analysis operations, in particular involving qualitative evaluation, from the areas of medicine, biology, microscopy, crystallography, cartography, astrophotography, etc.

As an example from the biological field, which at the present time can only be handled by human beings, mention may be made of examination of a sample under a microscope; in that context, an answer is sought to the question of how many oval bacteria and how many broken-up bacteria are present and where they are to be found on the image. After input (learning effect) of the images of oval and broken-up bacteria into the reference storage means, that question can be automatically answered by the process and system according to the invention.

Picture scene analysis:

Person recognition, article recognition generally (for example countng types of motor vehicles), . . .

Adaptive matching of reference data which is organised in hierarchical abstract fashion to the environment—optimisation and building up an environmental model. In this case the term "environment" and also outside world is used to denote all items outside the system according to the invention, which are classifiable and which can possibly be independently abstracted by the evaluator, to provide a superior reference card index system. That aspect will be described in greater detail hereinafter.

Automatic character readers (cheap version):

If the coarse position of characters can be determined by other methods, the process according to the invention, in spite of permitting character falsification, is adequate for achieving rapid decoding by means of cheap and small systems. The cheap version is used when the position of the letters can be limited to a small area or is known and if only slight degrees of twist or rotation are to be expected; it is then possible to provide for simplifications in the process and system according to the invention.

Movement identification (comparison of successive images):

Automatic searching for one and the same object or article in successive images (for example an article which is present in the first image is stored as a reference article and an investigation is subsequently effected, to ascertain where that article occurs or is to be found in all subsequent images).

Following movement of an article:

After article identification has once taken place, it is only necessary to provide for correlation in the four article or search dimensions, position in two axes, enlargement and twist, or varying article view (if that changes so quickly, as a result of the movement, that the original reference image would no longer make the article clearly recognisable in the new position). That situation of use occurs if for example a robot is to take an article or workpiece from a moving belt. In that connection it is possible to determine the speed and direction of the movement so that the moving article can be properly followed even without an ideal background.

The last two uses occur for example in the automatic analysis of cloud chamber images or in astronomy when taking successive photographs of a star.

Examples will now be set out, in regard to the identification of four-dimensional patterns on any scale (that is to say patterns with four search dimensions, namely positions x,y, twist and magnification) or patterns which can be step-wise reduced to four search dimensions:

Word-wise or sentence-wise processing of speech signals as two-dimensional patterns (that is to say flat when considered from above), for example with the coordinates of time/amplitude or time/frequency content (for example vocoder with technical frequencies) or time/formant content (standardised sound components of human language, improved vocoder) irrespective of fluctuations in volume and change in tempo.

Abstract similarity comparisons by investigation of the correlation peak of the second stage (for example style comparisons in respect of painters; if the system is aware of 2-3 pictures of a painter, it is possible to attribute a new fourth picture to that painter).

Data bank imaging (forgery elimination, word similarity recognition). For example if incorrect entries are made in a data bank, it should be possible to recognise or find same by two-dimensional Fourier transformation, together with subsequent correlation operation and then reverse transformation, in spite of the errors. However it is also possible for example for mathematical symbols to be stored in a card index system, and then it is possible to read in a mathematical formula which is structurally compared to stored identical or similar formulae. In that connection the position of the formulae to be sought is immaterial as it drops out in the Fourier transformation operation.

It is possible with the present process, in a similar manner as is already known in connection with holographic systems, to form abstract generic terms in respect of groups of articles (in the image plane) and to produce hierarchical search structures therefrom. The overall transformation of $g_1(x,y)$ into $G_{II,1}$ and $A_{II,1}$ respectively represents an abstraction step due to the omission of the parameters in respect of position, size and orientation and on the other hand by virtue of demonstrating geometrical properties or characteristics, while in this case, in contrast with known holographic abstraction steps, the parameters in respect of size and orientation advantageously are also eliminated.

The term abstraction is used in the broader sense to indicate the formation of generic terms from a finite random sample of the subordinate terms. As the present process also permits comparisons to be made in respect of patterns which are not ideally identical but only structurally similar, it is possible to make use of the strengthening effect of pattern additions which are independent in respect of position, size and orientation but which are structure-related.

When there is a number of unknown article images which may be associated with a series of article groups (for example faces, motor vehicles, etc.), it is possible to perform correlation therebetween in all possible pairing combinations, in order to ascertain the probability of identity (=similarity factor) (instead of between a reference and an image to be identified) and then by evaluation of the similarity factor to decide on the aspect of belonging to a common group. In that fashion it is already possible subsequently to form the group associations which exist in accordance with the basic factors involved.

Now, within each of those groups, it is possible for example to add the spectra after inverse rotary extension and shift to common random standard factors. The result or the inverse Fourier transform thereof then represents so-to-speak the structural average of the individual images of the group, irrespective of their respective position, size and orientation values, and can thus be subsequently used as a generic term for the identification of new articles, without always having to search through all individual images of all groups.

Producing a hierarchical search structure of that kind and the arrangement and comparative consideration thereof in the generic term can additionally be effected in an absolutely autonomous fashion by means of a system which performs the process of the invention. It is therefore possible to provide for automatic assembly, up-dating and use of constantly adapting data structures and environmental models which are organised on a hierarchical basis with a rising degree of abstraction. Like abstraction, association and therewith the provision of cross-references on the basis of partial identity is known in the holographic area. Holographic diffraction and interference patterns may be described by means of Fourier transformation.

If for example the Fourier transform $G_1(u,v)+G_2(u,v)$ of an image $g_1(x,y)+g_2(x,y)$ comprising the representations of two different articles is given as a desired associative linking, then forming the power spectrum gives $I=|G_1+G_2|^2=G_1.G_1{}^*-G_2.G_2{}^*+G_1.G_2{}^*+G_1{}^*.G_2$.

If now that spectrum is multiplied by the Fourier transform of one of the two representations, for example $G_1$, and the result is subjected to Fourier reverse transformation, then that gives for the sub-term $G_1{}^*.G_2$: $F^{-1}\{G_1{}^*.G_2.G_1\}=g_1 \otimes g_1{}^* \otimes g_2$, which is the auto-correlation of $g_1$, ideally a Dirac impulse, convoluted with $g_2$, which approximately gives $g_2$ depending on the quality of the auto-correlation effect. Therefore, by means of $g_1$, $g_2$ is associatively reconstituted from the sum spectrum, and vice-versa, while multiplication of $I$ by a foreign spectrum results in statistical noise. That leads to the possibility of automatically building up branching association chains.

Associative processes of that kind may in turn be performed in connection with the present process irrespective of size, position and orientation of the specific pattern representations and associative chains can be autonomously built up.

Insofar as all information set forth in relation to the present process was drafted in particular in regard to optical images and patterns, but can be applied to two-dimensional signals of any origin, consideration is also to be given in particular to abstraction and association from the point of view of non-visual patterns which possibly themselves already symbolise abstract contents.

We claim:

1. A method for analyzing a two dimensional image in an original image plane, for the purpose of determining a probability of identity, a twist angle, and an enlargement factor, between known reference patterns and contents or portions of the image, irrespective of at what position or positions of the image to be analyzed the contents or portions of the image are located, comprising;

storing and processing the image to be analyzed in digital form;

subjecting the stored image to a two-dimensional Fourier transformation operation to generate a Fourier transform of the image;

determining a separated-off amplitude distribution or another amplitude distribution which can be ascertained from said separated-off amplitude distribution of said Fourier transform of the image;

comparing, in a Fourier range, said separated-off amplitude distribution, or said other amplitude distribution, to separated-off amplitude distributions or other amplitude distributions which can be determined therefrom of the reference patterns which are stored digitally;

ascertaining the respective probability of identity, the twist angle and the enlargement factor as between the reference pattern and the image content or portion;

locating an image content or portion in the image which is identical with a stored reference pattern with the ascertained degree of probability of identity by assimilating the reference pattern, or the Fourier transform of the reference pattern, to the image content or portion in respect of size and orientation by inverse rotary extension with said ascertained twist angle and enlargement factor and by then establishing the position or positions at which the reference pattern, when converted by inverse rotary extension, has maximum identity with a section of the image being analyzed.

2. The method according to claim 1 wherein the amplitude distribution of the image, which has been acertained from the Fourier transform of the image, or a distribution which can be ascertained therefrom, is determined in the form of a real two-dimensional image matrix in polar co-ordinates, and then a two dimensional polar rotary extension correlation in respect of said real two-dimensional image matrix which is stored in polar coordinates, with real reference matrices which are also stored in polar co-ordinates, said real reference matrices representing amplitudes distribution or distribution which can be ascertained therefrom, in respect of the reference patterns, is carried out, as a result of which matrix values are obtained for probabilities of identity in respect of the correlated real image and reference matrices with associated twist angles and enlargement factors of the image matrix in relation to the reference matrices said matrix values being stored to form a correlation matrix having at least one maximum, each of said at least one maximum having a relative degree of steepness.

3. The method according to claim 1 further comprising the steps of:

forming a real power matrix in semi-logarithmic polar co-ordinates from a complex matrix having real and imaginary components which is present after the two-dimensional Fourier transformation operation, by formation of an absolute square, wherein to form the real power matrix in preferably semi-logarithmic polar co-ordinates, firstly the real portion and the imaginary portion of the complex matrix undergo co-ordinate conversion in themselves by constantly associated interpolation to preferably semi-logarithmic polar co-ordinates, whereupon the power matrix is ascertained by squaring of the real and imaginary portions and then addition; and comparing said real power matrix to similarly formed and stored real power matrices of the reference patterns.

4. The method according to claim 2 further comprising the steps of:

detecting said at least one maximum of the correlation matrix obtained as a result of the correlation operation; and storing values associated with said at least one maximum, for twist angle and enlargement factor associated with the inverse rotary extension operation or operations which are applied to the respective reference pattern in order to achieve a relative identity of the image with the respective reference patterns.

5. The method according to claim 3 wherein a Fourier transform of the two-dimensional image matrix is ascertained in a logarithmic polar co-ordinate system with a logarithmic radius scale and Fourier transforms of reference matrices of the reference patterns, are stored in a logarithmic polar co-ordinate system with a logarithmic radius scale whereby the rotary extension becomes a rotary shift, whereupon a polar rotary shift correlation operation is carried out.

6. The method of claim 5 wherein the co-ordinates of the logarithmic polar co-ordinate system are translated on to a right angled axis system whereupon a discrete two-dimensional right-angled correlation operation is carried out in respect of the Fourier transforms of the real two-dimensional image matrix with the Fourier transform of the reference matrices, with the rotary extension or rotary shift being resolved into two shifts along the axes of the axes system.

7. The method according to claim 6 wherein, in a learning operation, the method further comprises the step of:

storing the Fourier transforms of the two-dimensional image matrix and of the reference matrices which have been generated from the two-dimensional Fourier transformation operation in the form of complex matrices or separate amplitude and phase matrices by inputting or reading in known reference images, preferably by way of an input intermediate storage means, in preferably abstractly hierarchical order.

8. The method according to claim 7 wherein, in a learning operation, the method further comprises the step of:

storing amplitude matrices which have been generated from the two-dimensional Fourier transformation operation, or image matrices which can be ascertained therefrom, preferably in polar co-ordinates by inputting or reading in known reference images, preferably by way of an input intermediate storage means, in the form of real reference matrices, in reference storage means, in preferably abstractly hierarchical order.

9. The method according to claim 8 further comprising the step of:

correlating the amplitude distribution which is stored in the form of an image matrix, or a distribution which can be ascertained therefrom, in respect of the image, and the amplitude distribution which is stored in the form of a reference matrix, or a distribution which can be ascertained therefrom, in respect of the reference pattern, in the Fourier range by the real image matrix and the real reference matrix each being subjected to a respective further two-dimensional Fourier transformation operation to generate a complex reference matrix and a complex image matrix, and the resulting complex matrices being multiplied together in an element-wise conjugated complex mode, and the product matrix thereupon being subjected to reverse Fourier transformation.

10. The method according to claim 9 wherein to establish the position or positions of an image content or portion, in the original image plane, which content or portion is detected in the Fourier plane with a given degree of probability of identity with a rotary-extended reference pattern, the reference pattern, which is subjected to inverse rotary extension with the ascertained values in respect of twist angle and enlargement factor, in said image plane with the image to be analyzed the identity maximum or maxima is or are detected.

11. The method according to claim 9 wherein to establish the position or positions of an image content or portion, in the original image plane, which content or portion is ascertained in the Fourier plane with a given degree of probability of identity with a rotary-extended reference pattern, the complex reference matrix which is subjected to inverse rotary extension with the ascertained values in respect of twist angle and enlargement factor is multiplied in conjugated complex and element-wise mode with the complex image matris in the Fourier range to generate a complex product matrix whereupon the complex product matrix is subjected to a two-dimensional Fourier reverse transformation operation and that finally said at least one maximum of the correlation matrix as a result of that correlation operation are detected and co-ordinate values which are associated with said at least one maximum are ascertained for the position or positions of the located image content or portion in the original image.

12. The method according to claim 11 wherein, when using semi-logarithmic polar co-ordinates, the inverse rotary extension of the complex matrix is performed by inverse integral displacement with respect to the logarithmic polar co-ordinates being used whereupon the resulting matrix is subjected to co-ordinate conversion by constantly associated reverse interpolation to Cartesian co-ordination.

13. The method according to claim 10 further comprising the step of:
carrying out a further inverse rotary extension or rotary shift (in relation to logarithmic polar co-ordinates) with the ascertained value, which is altered through 180°, in respect of the twist angle, and the acertained value in respect of the enlargement factor, whereupon after the correlation operation has been carried out any maxima in respect of probability of identity that may be present can be detected.

14. The method according to claim 11 further comprising the step of:
Passing, by way of respective contour-accentuating O-phase filters, both the real reference matrix which is subjected to inverse rotary extension with the ascertained value in respect of the twist angle or with the ascertained value with respect to twist angle changed through 180° and also the real image matrix of the image to be analyzed, before they are multiplied in conjugated complex and element-wise mode, together with the associated phase matrices.

15. The method according to claim 11 further comprising the step of:
multiplying in the Fourier Range the complex reference matrix which has been subjected to inverse rotary extension and the complex image matrix, before their conjugatedly complex multiplication, in an element-wise manner respectively with a contour-accentuating real O-phase filter matrix with an underlying Fourier co-ordinate system having an origin, said filter matrix having elements which increase in value as their distance from the origin of the underlying Fourier co-ordinate system increases.

16. The method according to claim 15 wherein for the purposes of classification of pattern similarity, the relative degrees of steepness of said at least one maximum of said correlation matrix are used.

17. The method according to claim 16 further comprising the step of:
ascertaining the relative degrees of steepness of the correlation maxima of the correlation matrix, by converting the correlation matrix to a logarithmic equivalent and subjecting the logarithmic equivalent to two-dimensional Fourier transformation to generate a two dimensional spectrum whereupon the two-dimensional spectrum is multiplied preferably by an O-phase filter in an element-wise manner by the distance of the respective pair of Fourier elements from the origin of the underlying Fourier co-ordinate system, and then said two-dimensional spectrum is subjected to a Fourier reverse transformation operation to generate a new spectrum matrix having amplitude maxima, the amplitude maxima of the new spectrum matrix obtained in that manner being a direct measurement in respect of the relative steepness of the correlation maxima of the correlation matrix.

18. The method according to claim 17 further comprising the step of:
setting elements of the real reference matrices which are below a given value to zero for better separability with a high foreign structure component in the image to be analyzed.

19. The method according to claim 18, when using a polar co-ordinate system in the Fourier range made up of radial and angular co-ordinates, to produce a quasi-periodicity in the direction of the radial co-ordinates for subsequent correlation in a window between two radial co-ordinates, further comprising the step of:
setting to zero values which are above a given radial co-ordinate, in respect of the real reference matrix, while in the real image matrix in the Fourier range, still real values are entrained at greater radial co-ordinates which values correspond to higher spatial frequencies or said values are also set to zero.

20. The method according to claim 19, for equal evaluation of different spatial frequency components, further comprising the step of:
accentuating linearly the elements of the amplitude matrices of the image to be analyzed and the reference patterns with the spatial frequency or accentuating quadratically the elements of the corresponding power matrices with the spatial frequency, preferably by an O-phase filter, before they are correlated with each other.

* * * * *